(12) United States Patent  
Kimura (10) Patent No.: US 7,807,957 B2  
(45) Date of Patent: Oct. 5, 2010

(54) LIGHT SOURCE UNIT AND PROJECTION TYPE IMAGE DISPLAY APPARATUS

(75) Inventor: Nobuyuki Kimura, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 710 days.

(21) Appl. No.: 11/739,793

(22) Filed: Apr. 25, 2007

(65) Prior Publication Data

US 2007/0285621 A1    Dec. 13, 2007

(30) Foreign Application Priority Data

May 16, 2006   (JP)   ............................ 2006-136003

(51) Int. Cl.  
*H01J 3/14*   (2006.01)

(52) U.S. Cl. ...................... 250/216; 250/225

(58) Field of Classification Search ............. 250/216, 250/225, 208.1; 353/31–38, 20; 329/619–622; 349/7–18, 96–99  
See application file for complete search history.

(56) References Cited

U.S. PATENT DOCUMENTS 6,607,276 B1 *   8/2003   Akiyama ..................... 353/38  
7,185,984 B2 *   3/2007   Akiyama ..................... 353/20

FOREIGN PATENT DOCUMENTS

| EP | 1 722 270 A1 | 11/2006 |
|---|---|---|
| JP | 07-028016 | 1/1995 |
| JP | 2000-122178 | 4/2000 |
| JP | 2000-322922 | 11/2000 |
| JP | 2001-092011 | 4/2001 |
| JP | 2001-249405 | 9/2001 |
| JP | 2005-234471 | 9/2005 |

* cited by examiner

*Primary Examiner*—Que T Le  
(74) *Attorney, Agent, or Firm*—Antonelli, Terry, Stout & Kraus, LLP.

(57) ABSTRACT

A projection display apparatus in which the longitudinal direction of an arc type lamp is parallel with the longitudinal direction of an aperture of a polarization exchange element.

15 Claims, 4 Drawing Sheets

LIGHT SOURCE UNIT AND PROJECTION TYPE IMAGE DISPLAY APPARATUS

INCORPORATION BY REFERENCE

The present application claims priority from Japanese application JP 2006-136003 filed on May 16, 2006, the content of which is hereby incorporated by reference into this application.

BACKGROUND OF THE INVENTION

The present invention relates to a projection display apparatus that forms an optical image in accordance with an image signal, by means of an image display element and then projecting the thus formed optical image onto a screen or the like.

JP-A-2001-92011 discloses, in FIG. 2, a liquid crystal projector comprising a light source unit 1 composed of a reflector 10, a short circuiting arc discharge lamp 20 arranged in such a way that the direction of its arc is orthogonal to a horizontally extending optical axis L of the reflector 10, and a condenser lens 30 located on the optical axis L in front of the short circuiting arc discharge lamp 20, a support plate 31 for supporting the condenser lens 30, a front glass pane 40, a first optical integrator lens 41a, a second optical integrator lens 41b, a polarized beam splitter 42, a second condenser lens 43, a half wavelength phase difference plate 44, a first aluminum mirror 45a, a second aluminum mirror 45b, a third aluminum mirror 45c, a first dichroic mirror 46a, a second dichroic mirror 46b, a relay lens 47, a field lens 48, a liquid crystal display panel 49, a color synthesizing cross prism 50, a projection lens 51 and a screen 52.

SUMMARY OF THE INVENTION

At first, explanation will be hereinbelow made of a polarization exchange element, and thereafter problems inherent to the liquid crystal projector disclosed in JP-A-92011 will be explained.

The polarization exchange element is composed of a plurality of light transmitting members each of which is a parallelepiped prism and which are arranged in an array and in parallel with one another in a plane orthogonal to a direction of an illumination optical axis, and polarized beam splitter (which will be hereinbelow abbreviated as "PBS") films and reflection films which are alternately arranged at interfaces among the light transmitting members. Further, a half wave phase difference plate is arranged at a light emergent surface through which light having passed through an aperture part on the incident side of the polarization exchange element and then through the PBS film is emerged.

One of light beams having passed respectively through the first integrator lens (which will be hereinbelow referred to as "first array lens) and the second integrator lens (which will be hereinbelow referred to "second array lens") and being then incident upon one of aperture parts, that is, for example, an S-polarized beam is reflected by the PBS film and then reflected by a reflection mirror opposed thereto so as to be emerged as an S-polarized beam. Further, a P-polarized beam is transmitted through the PBS film is turned by the half-wavelength phase difference plate into an S-polarized beam which is then emerged. The polarization exchange element is composed of a plurality of polarization exchange parts each having the above-mentioned basic function, that is, such a function that the light beams having been incident thereupon are emerged with being polarized in a predetermined uniform direction (which is in this case the S-polarized direction).

By the way, in such a case that a light beam is incident upon between the aperture parts, the emergent light beam has, in this case, a polarization which is turned by an angle of 90 deg., from the predetermined polarized direction is obtained (in this case, a P-polarization). That is, the efficiency of polarization exchange is lowered. Thus, an aluminum plate or the like is usually interposed between the aperture parts so as to form a light shield part for blocking the light beam.

Next, explanation will be hereinbelow made of the problems inherent to the liquid crystal projector disclosed in the above-mentioned patent document 1.

The distance between the center of the arc of the lamp to the reflector is set to A, and the distance between the first array lens and the second array lens is set to B. In this case, the center of the arc of the lamp is at the focal position of the reflector having a revolution paraboloid shape, and accordingly, the distance A is equal to the focal distance of the reflector, and accordingly, the distance A is a positional function on the paraboloid of the reflector. Further, the second array lens is arranged at a position in the vicinity of an approximate focal point of the first array lens, and accordingly, the distance B is the focal distance of the first array lens.

Incidentally, the first array lens is designed in such a way that the arc and the respective lens cells of the second array lens have a relationship (conjugate relationship) therebetween in which they become an object and images, and accordingly, an arc image is formed on each of the lens cells of the second array lens. Since the second array lens and the polarization exchange element are arranged adjacent to each other, the arc image formed on each of the lens cells of the second array lens is similarly formed also on the polarization exchange element. The multiplying factor $\beta$ of the arc image is approximated by the following formula 1 in view of the distances A and B:

$$\beta = B/A \qquad (1)$$

In consideration with a transmittance of a light beam passing through an aperture of the polarization exchange element, since the distance A is short as to a light beam which is emerged from the arc and which is then reflected by the reflector around the center of the latter, the multiplying factor $\beta$ of the arc image becomes larger. Further, in the liquid crystal projector disclosed in the above-mentioned patent document 1, the direction of the arc shape of the lamp is perpendicular to the longitudinal direction of the aperture parts of the polarization exchange element, and accordingly, the quantity of light which is incident upon the shield parts of the polarization exchange element is increased so as to lower the transmittance of the light, resulting in lowering of the light availability.

The present invention is devised in view of the above-mentioned problems, and accordingly, an object of the present invention is to provide a projection display apparatus which is composed of a polarization exchange element having an improved light transmittance so as to enhance the light availability.

An aspect of the present invention, the direction of the arc shape of a lamp is in parallel with the longitudinal direction of the aperture parts of the polarization exchange element.

Other objects, features and advantages of the invention will become apparent from the following description of the embodiments of the invention taken in conjunction with the accompanying drawings.

DETAILED DESCRIPTION OF PREFERRED EMBODIMENTS

Explanation will be hereinbelow made of the invention in a best mode with reference to the accompanying drawings. It is noted here that like reference numerals are used to denote like parts throughout the drawings, and explanation to a part which has been once explained will be thereafter omitted.

The essential feature of an embodiment 1 is the provision of such a configuration that an arc shape lamp is arranged so that the longitudinal direction of the lamp is extended in parallel with the longitudinal direction of aperture parts of a polarization exchange element in order to improve the light transmittance of the polarization exchange element, and a multiplying factor around the optical axis of an arc image formed in the vicinity of a second array lens is decreased.

Figure 4:
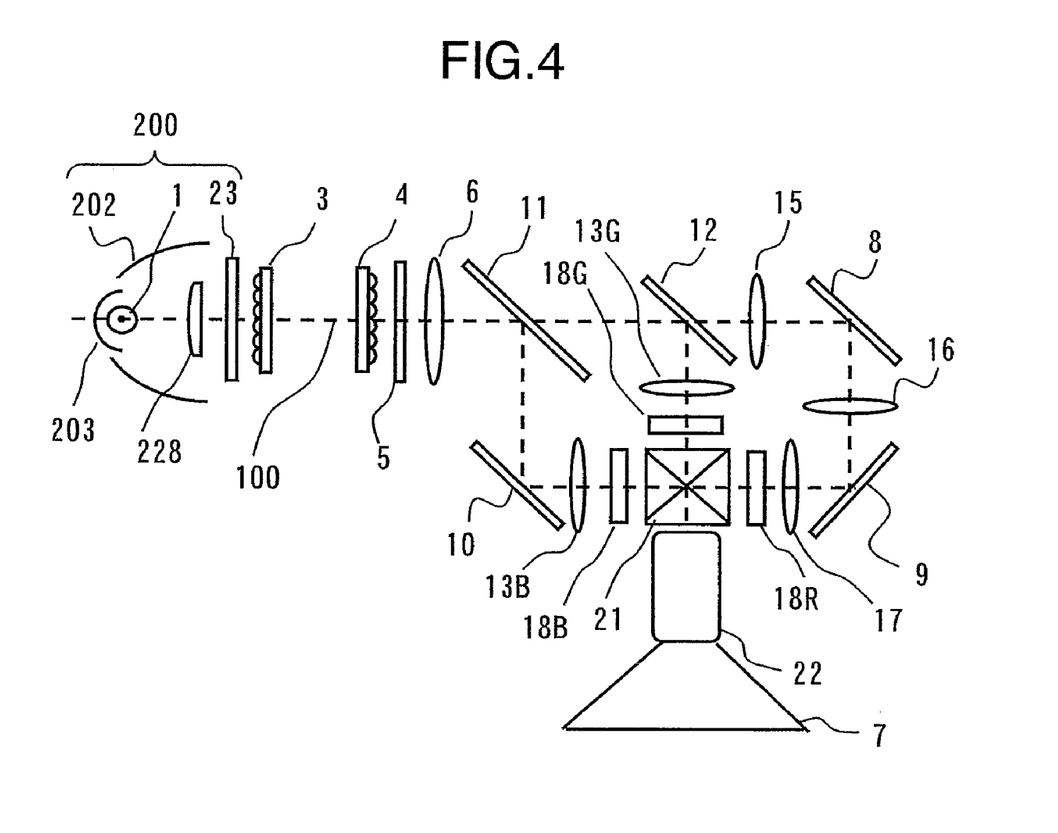
FIG. 4 is a schematic view illustrating an optical system in the projection display apparatus in the embodiment 1.

Referring to FIG. 4 which is a schematic view illustrating an optical system in a projection display apparatus utilizing an illumination optical unit in the embodiment 1, an optical source 200 in the embodiment 1 is composed of an arc shape lamp 1, a first reflector 202 having a revolution paraboloid type and arranged on the optical axis in front of the lamp 1, a second reflector 203 having a spherical surface shape and arrange in rear of the lamp 1, a parallelizing lens 228 arranged on the optical axis in front of the lamp 1 by a predetermined distance from the lamp 1, and an explosion-protection glass pane 23 for prevent fragments from scattering when the lamp 1 bursts. It is noted that the optical source 200 will be detailed later.

The substantially semispherical second reflector 203 having a spherical reflection surface is arranged in rear of the lamp 1, being adjacent to the lamp 1 so as cover the lamp 1. Further, the first reflector 202 having a revolution paraboloid-like reflecting surface is arranged in front of the lamp 1. The reflection surface of the first reflector 202 is formed so as to extend from the a position in the vicinity of the position of the aperture of the second reflector 203.

A light beam emerged rearward from the lamp 1 is reflected upon the second reflector 203 having a spherical reflection surface, and is then emitted forward. A part of the light beam reflected and emitted forward is reflected upon the first reflector 202 so at be turned into a light beam in parallel with an illumination optical axis 100, and is then incident upon the illumination optical unit after passing through the explosion-protecting glass pane 23. The remaining part of the light reflected and emitted forward, which is not reflected at the first reflector 202 is turned into a light beam in parallel with the illumination optical axis 100 after passing through the parallelizing lens 228, and is then incident upon the illumination optical unit after passing through the explosion-preventing glass pane 23. It is natural that a light beam emerged directly forward from the lamp 1 without by way of the second reflector 203 is also directed partly toward the first reflector 202 and is directed partly toward the parallelizing lens 228, and accordingly, they are turned into light beams in parallel with the illumination optical axis.

It is noted that illumination optical unit is composed of a first array lens 3 and a second array lens 4, that is, an array lens group for equalizing the illumination intensities of the light beams, and a polarization exchange element 5 for unifying the polarized directions of the light beams.

The first array lens 3 is composed of a plurality of lens cells having a rectilinear shape substantially similar to the shape of an image display element as viewed in the direction of illumination optical axis and arranged in a matrix-like (two-dimensional) pattern, for splitting the light projected thereonto from the light source into a plurality of light beams which are therefore efficiently led through the second array lens 4 and the polarization exchange element 5. That is, the first array lens 3 is designed so as to have an optically conjugate relationship with the lamp 1 and the lens cells of the second array lens 4.

The second array lens 4 composed of a plurality of lens cells having a rectilinear shape and arranged in a matrix-like pattern, similar to the first array lens 3 projects shapes of the lens cells of the first array lens 3 which are associated respectively with the lens cells of the second array lens 4, onto the image display elements 18 (18R, 18G, 18B).

At this time, the light beams from the second array lens 4 are unified in a predetermined polarized direction, and the projected images of the lens cells of the first array lens 3 are superposed on the respective image display elements 18 (18R, 18G, 18B) by means of a focusing lens 6, condenser lenses 13 (13G, 13B), a first relay lens 15, a second relay lens 16 and a third relay lens 17.

It is noted that the second array lens 4 and the focusing lens 6 arranged adjacent to the former are designed so that the respective lens cells of the first array lens 3 and the image display elements 18 (18R, 18G, 18B) have an optical conjugate relationship therebetween, and accordingly, a plurality of light beams obtained by splitting a light beam in the first array lens 3 are projected onto the image display elements 18 (18R, 18G, 18B) and are superposed with one another thereon by the second array lens 4 and the converging lens 6, thereby it is possible to effect an illumination having a highly uniform intensity distribution at a level with no problem in practical use.

In the above-mentioned process, for example, the B light beam (in the blue color range) is reflected by a dichroic mirror 11, but the R light beam (in the red color range) and the G light beam (in the green color range) are transmitted therethrough so as to be split into two color beams, and further, the G light beam and the R light beam are separated by a dichroic mirror 12 into a G light beams and an R-light beam. For example, the G light beam is reflected by the dichroic mirror 12 but the R light beam is transmitted therethrough so as to be finally split into three color beams. There may be considered various other ways for splitting the light beams as stated above. That is, the R light beam may be reflected by the dichroic mirror 11 but the G light beams and the B light beams may be transmitted therethrough, or the G light beam may be reflected thereby but the R light beam and the B light beam may be transmitted therethrough.

The B light beam reflected by the dichroic mirror 11 is reflected by a reflection mirror 10, then is transmitted through the condenser lens 13B and through the image display element 18B for the B light, and is incident upon a light synthesizing prism 21. Meanwhile, of the G light beam and the R light beam transmitted through the dichroic mirror 11, the G light beam is reflected by the dichroic mirror 12, then is transmitted through a condenser lens 13G and is incident upon the image display element 18G for the G light beam. The G-light beam is transmitted through the image display element 18G, and is then incident upon the light synthesizing prism 21. Further, the R light beam is transmitted through the dichroic mirror 12, and is converged by the first relay lens 15, and is then further reflected by the reflection mirror 8. Thereafter, the R light beams is converged by the second relay lens 16, is then reflected by the reflection mirror 9, and thereafter is further converged by the third relay lens 17 so as to be incident upon the image display element 18R for the R light beam. The R light beam having passed through the image display element 18R is incident upon the light synthesizing prism 21.

The B light beam, the G light beam and the R light beam having passed through the image display elements 18 are synthesized by the light synthesizing prism 21 into a color image, and are transmitted to the screen 7 through a projection lens 22 which may be, for example, a zoom lens. The optical images which are formed by light intensity modulation on the image display elements 18 (18R, 18G, 18B) are multiplied and projected onto the screen 7 by the projection lens 22, and accordingly, the function of the projection display apparatus is exhibited.

It is noted that no relay lens is used on each of the first optical path (for B light beam) and the second optical path (for G light beam), but a relay lens is used on the third optical path (for R light beam) in order to set the optical path length thereof to be equal to that of the optical paths for the G and B light beams.

Explanation will be hereinbelow made of the reason why the projection display apparatus having an enhanced light availability can be provided in the embodiment 1 with reference to FIGS. 1 and 3. The orthogonal coordinates system having an optical axis set along the Z-axis, is introduced here in order to simplify the explanation thereof. That is, within a plane orthogonal to the Z-axis, the axis having a direction which is parallel with a long length side of the rectilinear effective illumination area of an image display element is set along the Y-axis, and the axis having a direction which is parallel with a short length side of the rectilinear effective illumination area of the image display element is set along the X-axis. This X-axis is substantially in parallel with the direction of the long length side of the aperture parts of the polarization exchange element, and the Y-axis is substantially in parallel with the direction of the short length side of the aperture parts.

Figure 1:
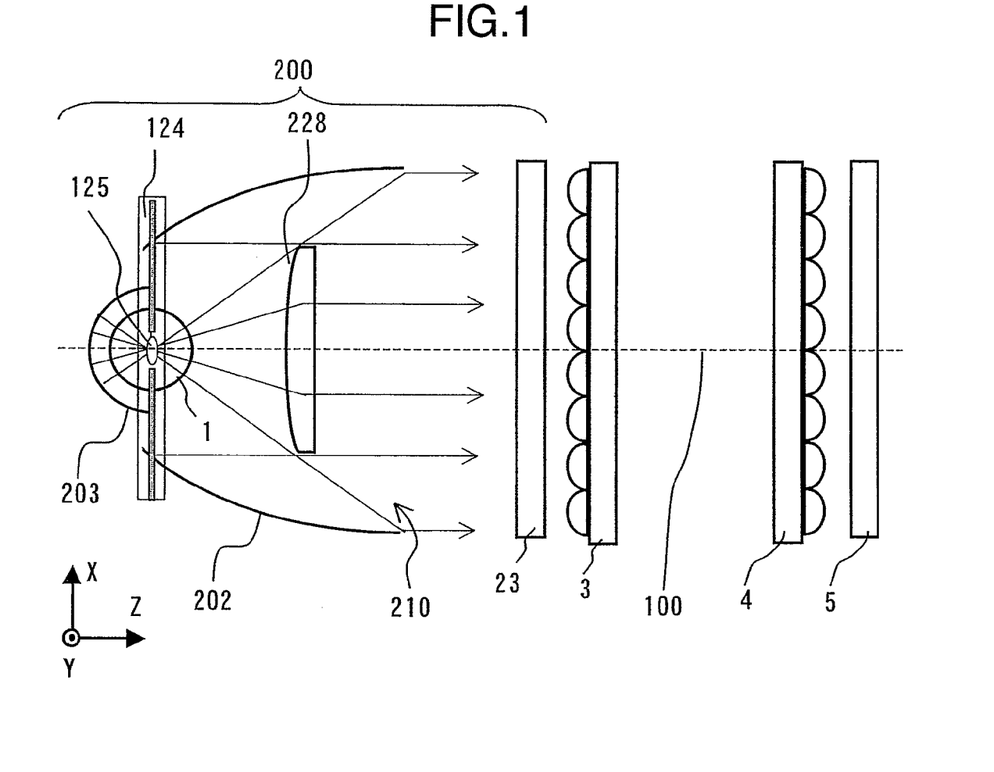
FIG. 1 is an enlarged view illustrating essential components arranged in a direction from a lamp to a polarization exchange element in an embodiment 1 of the present invention.

FIG. 1 is a view illustrating an essential part between the lamp and the polarization exchange element in the embodiment 1, that is, an XY sectional view including the illumination optical axis, as viewed in the direction of the Y-axis. Further, FIG. 3 shows arc images on the polarization exchange element in the first embodiment.

In the embodiment 1, in order to improve the light transmittance of the polarization exchange element 5, the longitudinal direction of the light emitting part of the lamp 1 is set so as to be extend, perpendicular to the illumination optical axis (Z-axis), and is substantially in parallel with the longitudinal direction of the aperture of the polarization exchange element 5. At first, explanation will be made of the reason whey the light transmittance of the polarization exchange element 5 is improved in this configuration.

Referring to FIG. 1, the longitudinal direction of the light emitting part of the arc type lamp 1 is extended, substantially perpendicular to the illumination optical axis 100 (Z-axis) and substantially parallel with the longitudinal direction of the aperture parts 55 of the polarization exchange element 5. That is, the arc 125 which is an elongated light emitting part has an illumination intensity distribution which is perpendicular to the illumination optical axis 100 and parallel with the aperture part 55 of the polarization exchange element 5 (as will be detailed later). The second reflector 203 having a spherical reflection surface is arranged in rear of the lamp 2. Since the reflection surface of the second reflector 206 is spherical, a light beam emitted rearward from the center of the lamp 1 is reflected at the second reflector 203, and thereafter again passes through the center of the lamp 1 so as to be emitted forward. Since the reflected light beam passes through the center of the lamp 1, substantially no shading is caused by an electrode 124, and accordingly, the optical loss is extremely small.

Should a reflector having a revolution paraboloid shape be used as the second reflector 203, a light beam emitted directly rearward from the lamp 1 would be emitted forward in parallel with the illumination optical axis 100 after it is reflected by the reflector having a revolution paraboloid shape, and as a result the reflected light would directly impinge upon the electrode 124, resulting in great optical loss. Thus, in the embodiment 1, the shape of the second reflector 203 which is arranged in rear of the lamp 1 is set to be spherical.

The light beam reflected at the second reflector 203 and then emitted forward and the light emitted directly forward from the lamp 1 are in part reflected by the first reflector 202 so as to be turned into a light beam parallel with the illumination optical axis 100, then passing through the explosion-protection glass pane 23, and is incident upon the first array lens 3. Further, the remaining part of the light beams emitted forward, which is not reflected by the first reflector 202, passes through a parallelizing lens 228 which is arranged in front of the lamp 1 by a predetermined distance from the lamp 1, and thereafter, it is turned into a light beam parallel with the illumination optical axis 100, and after passing through the explosion-protection glass pane 23, is incident upon the first array lens 3. It is noted that the position of the center of the emission of the lamp 1 is set at the focal point of the parallelizing lens 228 in order to turn a light beam incident upon the parallelizing lens 228 into a light beam parallel with the illumination optical axis 100.

Should no parallelizing lens 22 be arranged, a substantial part of the light beams which would otherwise be incident upon the parallelizing lens 228 would be emitted off obliquely from the aperture part of the first reflector 202 so as to be unavailable, resulting in optical loss. In view of this matter, the light source 200 in the embodiment 1 can enhance the light availability.

The first array lens 3 splits a light beam incident thereupon into a plurality of light beams by means of a plurality of lens cells arranged in a matrix pattern, and accordingly, guides the plurality of light beams through the second array lens 4 and the polarization exchange element 5, efficiently.

Figure 3:
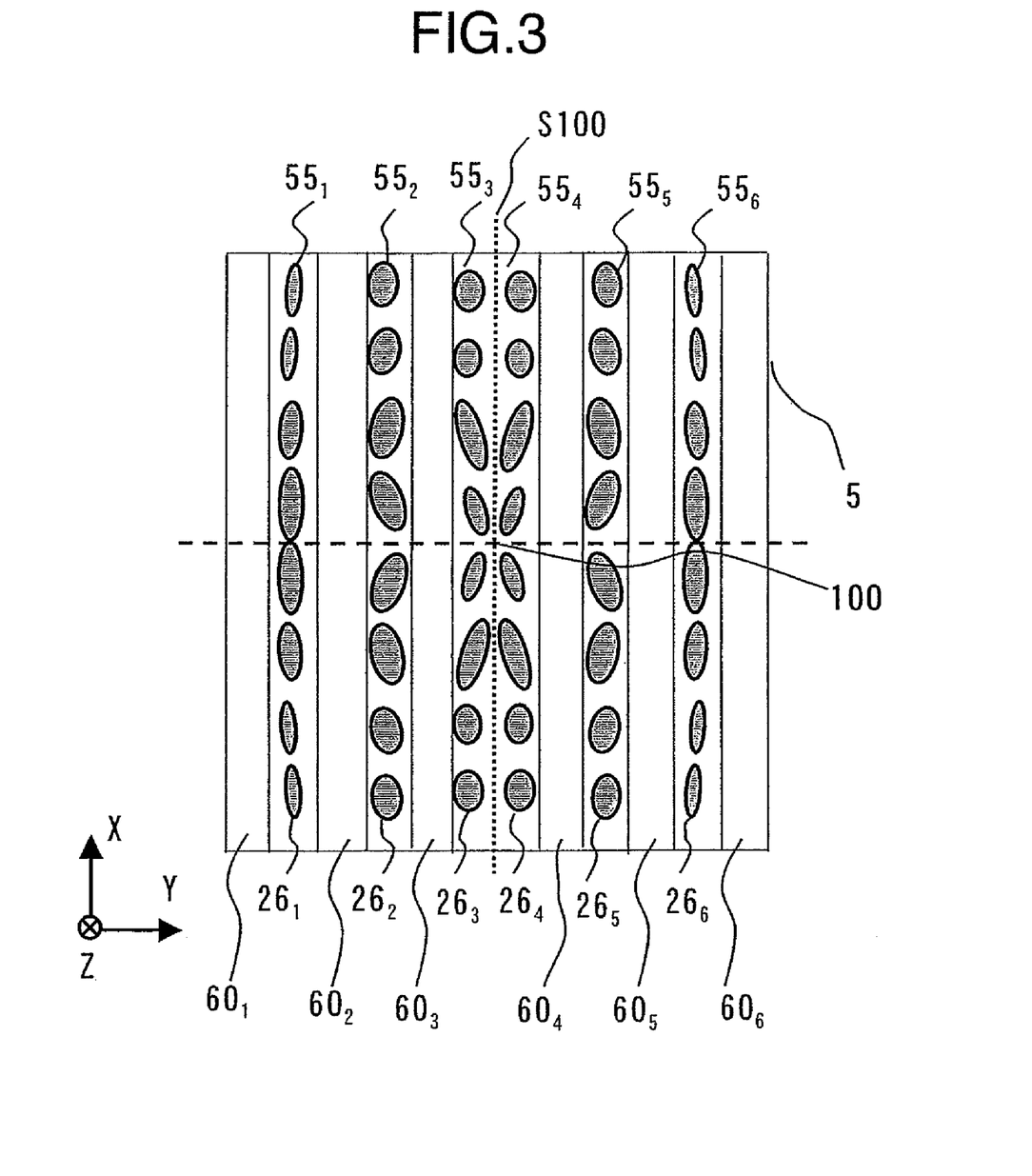
FIG. 3 is a view illustrating arc images formed on the polarization exchange element in the embodiment 1.

FIG. 3 shows a patters of arc images 26 which have been formed on the surface of the polarization exchange element 5 in the above-mentioned situation. Since the longitudinal direction of the arc 125 is perpendicular to the illumination optical axis 100, and is substantially parallel with the longitudinal direction of the aperture parts 55 of the polarization exchange element 5, the arc 125 has an illumination intensity distribution which is, as shown in FIG. 3, parallel with the aperture parts 55 of the polarization exchange element 5. Thus, of the arc images 26 formed on the polarization exchange element 5, those which have been reflected by the first reflector lens 202 and which are formed on center aperture parts $55_3$, $55_4$ of the polarization exchange element 5 around the illumination optical axis 100 have illumination intensity distributions which are substantially circular because of such understanding that the arc 125 is viewed in a substantially longitudinal direction (X-axial direction) thereof by the eye which is set at a position of each of the lens cells in the first array lens so as to observe the arc 125 through the intermediary of the first reflector 202. Further, of the arc images 26 formed on the polarization exchange element 5, those which have passed through the parallelizing lens 228 and which are formed on the center aperture parts $55_3$, $55_4$ around the optically axial plane S100 are elongated along the longitudinal direction of the aperture parts of the polarization exchange element 5 because of such understanding that the arc 125 is viewed being enlarged by the eye which is set at a position of each of the lens cells in the first lens array so as to observe the arc 125 through the parallelizing lens 228, that is, it may be considered that the parallelizing lens serves as a magnifier.

Usually, the multiplying factor of the arc image 26 is small in the peripheral edge side, remote from the illumination optical axis of the aperture parts $55_3$, $55_4$ so that the optical loss is less, but the multiplying fact is large in the illumination optical axis side so that the arc images overlap shield parts adjacent to the aperture parts $55_3$, $55_4$ so as to incur an optical loss. Accordingly, in the embodiment 1, the parallelizing lens 228 is arranged in front of the lamp 1 by a predetermined distance therefrom on the illumination optical axis. The center of emission of the lamp 1 is located at the position of the focal point of the parallelizing lens 228, that is, the focal distance of the parallelizing lens 228 becomes the predetermined distance mentioned above. As a result, the multiplying factor of the arc image on the illumination optical axis side of the aperture parts $55_3$, $55_4$ can be decreased. It is noted that an arc image of the light beam emitted direct to the parallelizing lens 228 from the lamp 1 can be obtained from the above-mentioned formula (1) where A is set to the distance from the center of the arc of the lamp 1 to the parallelizing lens 228. Accordingly, the arc images $26_3$, $26_4$ in the aperture parts $55_3$, $55_4$ fall within therein, and therefore, the optical loss can be reduced.

Further, of the arc images 26 formed on the polarization exchange element 5, those in aperture parts $55_1$, $55_6$ which are remote from the center (the optical axial plane S100) of the polarization exchange element 5, are elongated along the longitudinal direction of the aperture parts of the polarization exchange element 5 because of such understanding that the arc 125 is observed substantially in the direction of the short length side (Y-axial direction) by the eye which is set at a position of each of the lens cell in the first array lens so as to observe the arc 125 through the intermediary of the first reflector 202. Moreover, the light beams incident upon the aperture parts $55_1$, $55_6$ are those which have been reflected around the aperture part 210 of the first reflector 202 which is remote from the illumination optical axis 100, and accordingly, the multiplying factors of the arc images $26_1$, $26_6$ are less. Accordingly, the arc images $26_1$, $26_6$ also fall even within their aperture parts $55_1$, $55_6$, and accordingly, the optical loss can be reduced.

The light transmittance of the polarization exchange element 5 will be considered in view of the above-mentioned fact.

At first, consideration will be made of the arc images $26_3$, $26_4$ formed in the center aperture parts $55_3$, $55_4$. Since the arc images $26_3$, $26_4$ have circular extremely narrow distributions, the quantities of the light beams incident upon the light shields parts $60_3$, $60_4$ of the polarization exchange element 5 are reduced, and accordingly, the light transmittance is enhanced.

Next, consideration will be made of the arc images $26_1$, $26_6$ formed in the aperture parts $55_1$, $55_6$ which are remote from the center of the polarization exchange element 5. The arc images $26_1$, $26_6$ have small sizes and are elongated along the longitudinal direction of the aperture parts of the polarization exchange element 5, and accordingly the quantities of the light beams incident upon light shield parts $60_1$, $60_2$, $60_5$, $60_6$ are reduced, and accordingly, the light transmittance is enhanced.

As stated above, according the embodiment 1, the availability of the light from the light source is enhanced, and further, the light transmittance of the polarization exchange element is improved, thereby it is possible to provide a projection display apparatus having a high light availability.

Next, explanation will be made of an example of determination of positions, shapes and curvatures of the spherical reflector, the revolution paraboloid reflector and the parallelizing lens which can enhance the availability of the light from the light source with reference to FIG. 2.

Figure 2:
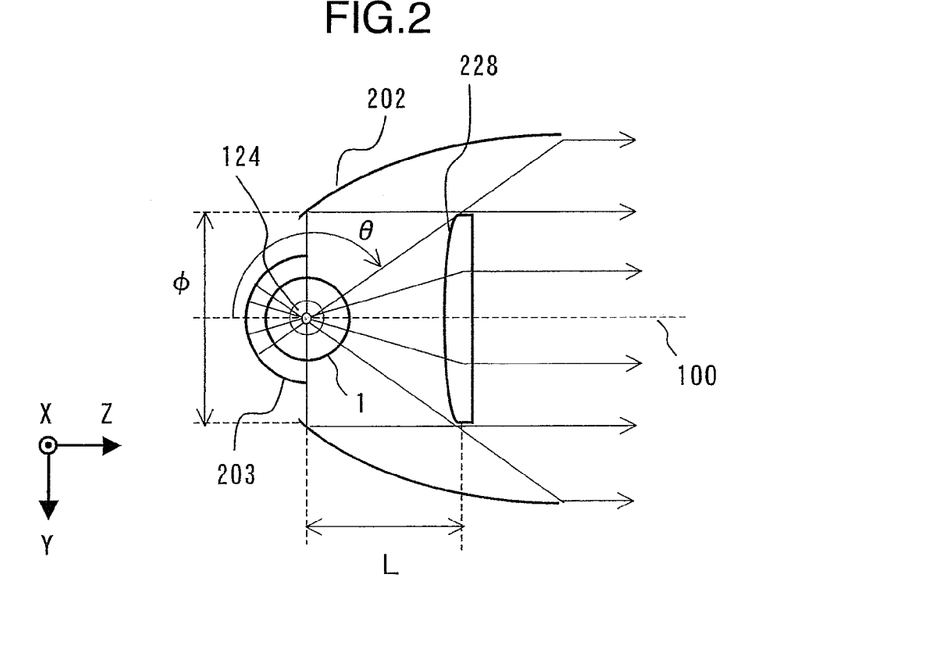
FIG. 2 is a view illustrating an essential part of a light source in the embodiment 1.

Referring to FIG. 2 which shows an essential part of the light source, and which is an XY sectional view containing therein the illumination optical axis as viewed in the X-axial direction.

At first, the position and the shape of the second reflector 230 are considered. In order to prevent the light beam from impinging directly upon the electrode 124, the spherical center of the second reflector 230 is arranged so as to be coincident with the center of the lamp 1, and it has such a shape as to cover the entire area of the rear surface of the lamp (having a solid angle $2\pi$). That is, the second reflector 203 is semi-spherical.

Should the radius of the second reflector 203 be too large, the light beam reflected by the second reflector 203 would pass through a position remote from the center of the lamp 1, and accordingly, the possibility of direct impingement upon the electrode would become higher. This is not only because the bulb has a shape which is not truly spherical as to both its interior and exterior, but also because the light emitting part, that is, the arc of the lamp 1 has a certain finite size. On the contrary, should the radius of the second reflector 203 be too small, it would excessively approach the bulb so that it could not be cooled. Accordingly, the radius of the second reflector 203 is set to be larger than the diameter of the bulb by a value in a range from 1 to 2 mm.

Next, the position and the shape of the first reflector 202 will be considered. The first reflector 202 has a revolution paraboloid shape, and is arranged in such a way the position of the focal point of the paraboloid is coincident upon the center of the lamp 1. The sectional shape of the first reflector 202 containing the illumination optical axis 100 is that of a parabolic curve with its apex side (the lamp 1 side) being cut. Further, the reflection surface of the first reflector 202 is formed so as to be extended from a position around the position of the aperture of the second reflector 203. It goes without saying that the second reflector 203 and the first reflector 202 may be integrally incorporated with each other, or alternatively, they may be formed so as to be independent from each other.

Finally, the position, the shape and the size of the parallelizing lens 228.

The parallelizing lens 228 has a size which is determined in such a way that no light beam reflected from the first reflector lens 202 passes the parallelizing lens 228. Should a parallel light beam reflected from the first reflector 202 be incident upon the parallelizing lens 228, the light beam incident upon the first array lens would not be perpendicular thereto. As a result, the light beam could not reach the image display element, and accordingly, the light availability would be lowered. Thus, the diameter of the parallelizing lens 228 may be set to be substantially equal to the effective diameter φ of the first reflector 202 on the side near to the lamp.

Next, the position of the parallelizing lens 228 will be considered. The parallelizing lens 228 is arranged at a position where a light beam reflected at the second reflector 203 and a light beam directly emitted from the lamp 1 to the parallelizing lens 228 can be taken into the parallelizing lens 208. That is, the relationship exhibited by the following formula 2 can be approximately satisfied:

$$\tan(\pi-\theta)=(\phi/2)\div L \quad (2)$$

where L is the distance from the center of the lamp 1 to the parallelizing lens 228, θ is an angle of a light beam which is reflected in an outermost effective range of the first reflector 202 from the illumination optical axis 100, and φ is the diameter of the parallelizing lens 228.

The formula 2 can be transformed into the following formula 3 from which the position L of the parallelizing lens 228 can be obtained.

$$L=(\phi/2)\div\tan(\pi-\theta) \quad (3)$$

Further, the curvature of the parallelizing lens 228 is determined in such a way that the distance from the center of the lamp 1 to the position of the parallelizing lens 228 is equal to the focal distance thereof since a light beam emitted from the center of the lamp 1 becomes in parallel with the illumination optical axis 100. The relationship exhibited by the following formula 4 can be satisfied:

$$(1/L)=(N-1)\times(1/R) \quad (4)$$

where R is the radius of curvature of the parallelizing lens 228 and N is the refractive index thereof.

The formula 4 can be transformed into the following formula (5) from which the radius R of curvature of the parallelizing lens 228 can be obtained:

$$R=(N-1)\times L \quad (5)$$

Since the refractive index of glass is about 1.5, the radius of curvature of the parallelizing lens 228 may be set to a value which is substantially a half of the distance L from the center of the lamp 1 to the parallelizing lens 228.

It is noted that explanation has been hereinabove made of the projection display apparatus utilizing three image display elements. However, it goes without saying that present invention may be also applied in an projection display apparatus having a single image display element.

Figure 5:
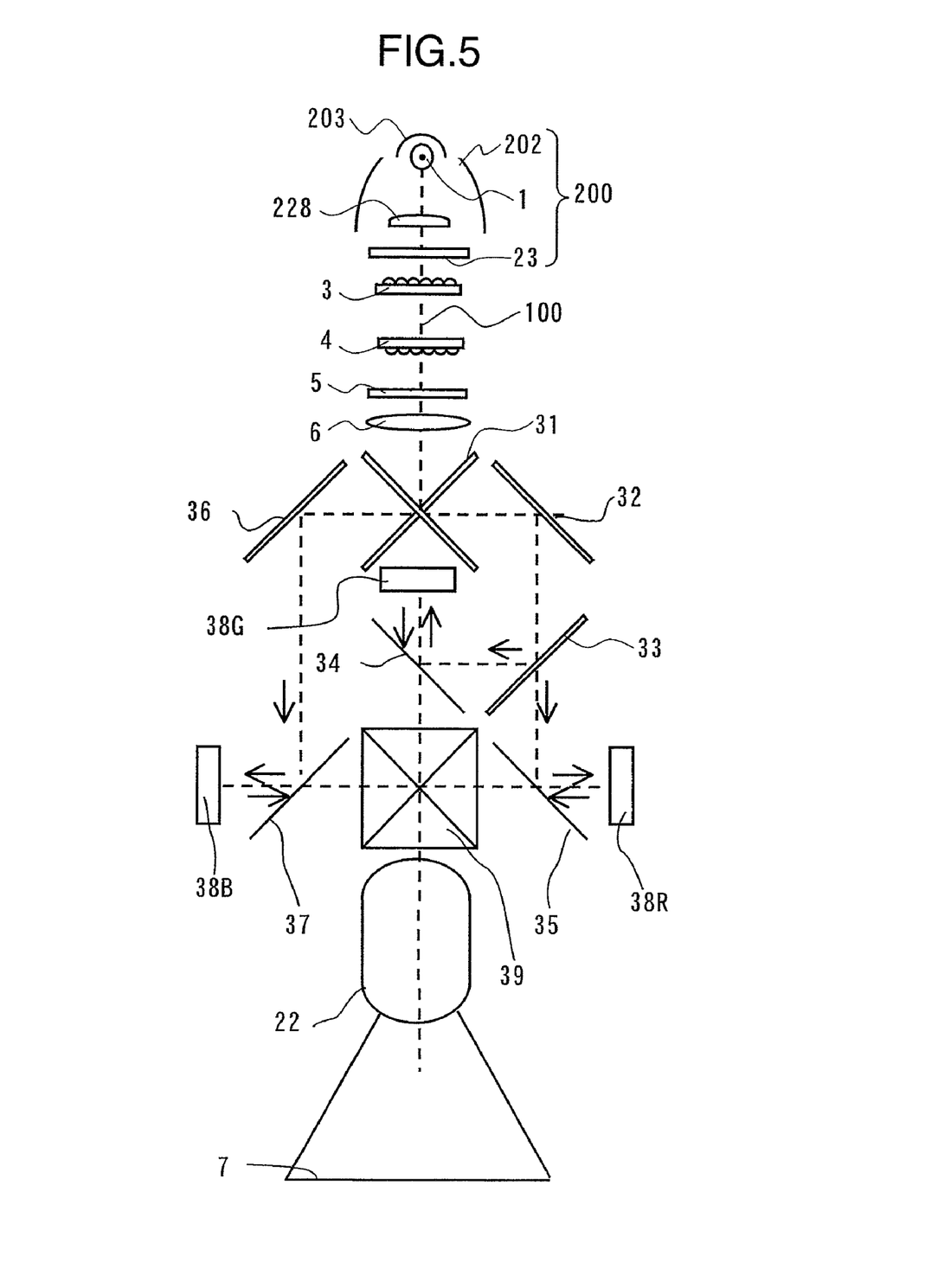
FIG. 5 is a schematic view illustrating an optical system in a projection display apparatus in an embodiment 2.

Explanation will be hereninbelow made of an embodiment 2 in which the light source 200 and the illumination optical unit stated in the embodiment 1 is applied in a projection display apparatus shown in FIG. 5. Referring to FIG. 5, the embodiment 2 has the same configuration as that of the first embodiment, except that a reflection type image display elements are used, in stead of the transmission type image display elements stated in the embodiment 1. Explanation to and illustration of the same configuration as that of the embodiment 1 will be omitted for the sake of brevity.

Similar to the embodiment 1, a light beam emitted from the lamp 1 passes through the illumination optical unit, and is then incident upon a color separating portion 31 which is a cross dichroic mirror and in which the light beam is split into an optical path other than, for example, a B optical path and the B optical path. The light beam on the optical path other then the B optical path, is reflected by the reflection mirror 32 and is then incident upon a color separating mirror 33 in which the light beam other than the B light beam is separated into, for example, a G light beam and an R light beam. For example, the G light beam thus separated is reflected at a selective reflection portion 34 and is then incident upon a reflection type image display element 850G. The G light beam is reflected at the reflection type image display element 850G so that its polarization is changed. The G light beam whose polarization has thus been changed is transmitted through the selective reflection portion 34, and is then incident upon the light synthesizing prism 39.

Further, the R light beam which has been transmitted through and separated by the dichroic mirror 33, is reflected by a selective reflection portion 35 and is then incident upon a reflection type image display element 850R. The R light beam is reflected by the reflection type image display element 850R so that its polarization is changed. The B light beam whose polarization has been changed is transmitted through the selective reflection portion 35 and is then incident upon the light synthesizing portion 39.

The B light beam separated by the color separating portion 31 is reflected by a reflection mirror 36, then is reflected by a selective reflection portion 37 and is then incident upon a reflection type image display element 38B. The B light beam is reflected at the reflection type image display element 38B so that its polarization is changed. The B light beam whose polarization has been change is transmitted through the selective reflection portion 37 and is incident upon the light synthesizing prism 39.

The G light beam which is incident upon the light synthesizing prism 39 is transmitted therethrough, but the R light beam and the B light beam which are incident upon the light synthesizing prism 39 are reflected by reflection surfaces owned by the light synthesizing prism 39, and accordingly, the G light beam, the R light beam and the B light beam are synthesized, then are transmitted through the projection lens 22 and are finally projected onto the screen 7.

As stated above, according to the embodiment 2, similar to the embodiment 1, there can be provided a projection type display apparatus having a high light availability. Although explanation has been made of the embodiment 2 in which the projection display apparatus has three image display elements, it goes without saying that the present invention may be applied in a projection display apparatus having a single reflection type image display element such as a DLP.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A projection display apparatus comprising:
   an arc type lamp for emitting a light beam having an illumination intensity distribution including a light emitting part and a light reflecting part,
   reflectors for reflecting of the light reflecting part the light beam from the arc type lamp, wherein the reflectors are comprised of a first reflector located in front of the lamp and having a revolution paraboloid shape and a second reflector arranged in rear of the lamp and having a spherical shape, for reflecting the light beam from the lamp, a parallelizing lens for parallelizing light beams emitted from the lamp other than those directed to the first and second reflector, and other than light beams reflected by the second reflector, an array lens group comprised of a first and a second array lens, for equalizing the illumination intensity distribution of the light beam from the reflectors, a polarization exchange element comprising a plurality of polarization exchange portions each comprising light shield parts for blocking light beams from the array lens group, aperture parts for allowing the light beams from the array lens group to pass therethrough, a polarized beam splitter film for splitting the light beams from the aperture parts into two kinds of light beams having different polarized directions, a reflection film for reflecting the light beam reflected by the polarized beam splitter film, and a half wave phase difference plate for changing polarized directions of light beams transmitted through the beam splitter film, and for unifying the polarized directions of the light beams, an image display element for modulating the light beams from the polarization exchange element, and a projection lens for projecting the light beams from the image display elements, wherein the longitudinal direction of the light emitting part of the arc type lamp is the same as the longitudinal direction of the aperture parts.

2. A projection display apparatus as set forth in claim 1, wherein the first reflector on a side near the lamp has a diameter which is equal to that of the parallelizing lens.

3. A projection display apparatus as set forth in claim 2, wherein the following relationship is satisfied:

$$L=(\phi/2)/\tan(\pi-\theta)$$

where L is a distance from the center of the lamp to the parallelizing lens, $\theta$ is an angle of a light beam which is reflected by the first reflector in an outermost effective range, from the optical axis of a light beam emitted from the lamp, and $\phi$ is a diameter of the parallelizing lens.

4. A projection display apparatus as set forth in claim 3, wherein the following relationship is satisfied:

$$R=(N-1)\times L$$

where R is a radius of curvature of the parallelizing lens, N is a refractive index and L is a distance from the center of the lamp to the parallelizing lens.

5. A projection display apparatus as set forth in claim 1, wherein the first reflector and the second reflector are integrally incorporated with each other.

6. A projection display apparatus, comprising:

an arc type lamp for emitting a light beam having an illumination intensity distribution including a light emitting part and a light reflecting part, a first reflector of the light reflecting part having a revolution paraboloid shape, for reflecting the light beam from the lamp, a second reflector of the light reflecting part having a spherical shape, for reflecting the light beam from the lamp, a parallelizing lens for parallelizing a light beams, other than those emitted to the first and the second reflector, and other than a light beam reflected by the second reflector, an array lens group comprised of a first and a second reflector, for equalizing the illumination intensity distributions of the light beams from the first reflector and the parallelizing lens, a polarization exchange element comprising a plurality of polarization exchange portions each comprising light shield parts for blocking light beams from the array lens group, aperture parts for allowing the light beams from the array lens group to pass therethrough, a polarized beam splitter film for splitting the light beams from the aperture parts into two kinds of light beams having different polarized directions, a reflection film for reflecting the light beams reflected by the polarized beam splitter film, and a half wave phase difference plate for changing polarized directions of light beams transmitted through the beam splitter film, and for unifying the polarized directions of the light beams, an image display element for modulating the light beams from the polarization exchange element, and a projection lens for projecting the light beams from the image display elements, wherein the longitudinal direction of the light emitting part of the arc type lamp is the same as the longitudinal direction of the aperture parts.

7. A projection type display apparatus as set forth in claim 6, wherein the first reflector on a side near the lamp has a diameter which is equal to that of the parallelizing lamp.

8. A projection display apparatus as set forth in claim 7, wherein the following relationship is satisfied:

$$L=(\phi/2)/\tan(\pi-\theta)$$

where L is a distance from the center of the lamp to the parallelizing lens, $\theta$ is an angle of a light beam which is reflected by the first reflector in an outermost effective range, from the optical axis of a light beam emitted from the lamp, and $\phi$ is a diameter of the parallelizing lens.

9. A projection display apparatus as set forth in claim 8, wherein the following relationship is satisfied:

$$R=(N-1)\times L$$

where R is a radius of curvature of the parallelizing lens, N is a refractive index and L is a distance from the center of the lamp to the parallelizing lens.

10. A projection display apparatus as set forth in claim 6, wherein the first reflector and the second reflector are integrally incorporated with each other.

11. A projection display apparatus, comprising:

an arc type lamp for emitting a light beam having an illumination intensity distribution including a light emitting part and a light reflecting part, a first reflector of the light reflecting part having a revolution paraboloid shape, for reflecting the light beam from the lamp, a second reflector of the light reflecting part having a spherical shape, for reflecting the light beam from the lamp, a parallelizing lens for parallelizing light beams other those emitted toward the first and second reflector, and other than a light beam reflected by the second reflector, an array lens group comprised of a first and a second reflector, for equalizing the illumination intensity distributions of the light beams from the first reflector and the parallelizing lens, a polarization exchange element comprising a plurality of polarization exchange elements, each comprising light shield parts for blocking light beams from the array lens group, aperture parts for allowing the light beams from the array lens group to pass therethrough, a polarized beam splitter film for splitting the light beams from the aperture parts into two kinds of light beams having different polarized directions, a reflection film for reflecting the light beams reflected by the polarized beam splitter film, and a half wave phase difference plate for changing polarized directions of light beams transmitted through the beam splitter film, and for unifying the polarized directions of the light beams,
a color separating portion for separating the light beams from the polarization exchange element into light beams having a plurality of colors,
a plurality of image display elements arranged for the plurality of colors,
an optical synthesizing prism for synthesizing the light beams from the plurality of image display elements, and
a projection lens for projecting the light beams from the plurality of image display elements,
wherein the longitudinal direction of the light emitting part of the arc type lamp is the same as the longitudinal direction of the aperture parts.

12. A projection type display apparatus as set forth in claim 11, wherein the first reflector on a side near the lamp has a diameter which is equal to that of the parallelizing lamp.

13. A projection display apparatus as set forth in claim 12, wherein the following relationship is satisfied:

$$L=(\phi/2)/\tan(\pi-\theta)$$

where L is a distance from the center of the lamp to the parallelizing lens, $\theta$ is an angle of a light beam which is reflected by the first reflector in an outermost effective range, from the optical axis of a light beam emitted from the lamp, and $\phi$ is a diameter of the parallelizing lens.

14. A projection display apparatus as set forth in claim 13, wherein the following relationship is satisfied:

$$R=(N-1)\times L$$

where R is a radius of curvature of the parallelizing lens, N is a refractive index and L is a distance from the center of the lamp to the parallelizing lens.

15. A projection display apparatus as set forth in claim 11, wherein the first reflector and the second reflector are integrally incorporated with each other.

* * * * *